(12) United States Patent
Bourgeois (10) Patent No.: US 8,192,811 B2
(45) Date of Patent: Jun. 5, 2012

(54) DELAMINATION-RESISTANT MULTILAYER CONTAINER, PREFORM AND METHOD OF MANUFACTURE

(75) Inventor: Philip D. Bourgeois, Perrysburg, OH (US)

(73) Assignee: Graham Packaging PET Technologies Inc., York, PA (US)

( * ) Notice: Subject to any disclaimer, the term of this patent is extended or adjusted under 35 U.S.C. 154(b) by 2267 days.

(21) Appl. No.: 10/388,616

(22) Filed: Mar. 14, 2003

(65) Prior Publication Data

US 2004/0076779 A1    Apr. 22, 2004

(51) Int. Cl.
*B29D 22/00* (2006.01)
*B29D 23/00* (2006.01)
*B32B 1/08* (2006.01)

(52) U.S. Cl. ..................................... 428/35.7
(58) Field of Classification Search .................. 428/35.7
See application file for complete search history.

(56) References Cited

U.S. PATENT DOCUMENTS

| | | |
|---|---|---|
| 3,686,069 A | 8/1972 | Winkler |
| 4,066,587 A | 1/1978 | Mains et al. |
| 4,141,751 A | 2/1979 | Moreland |
| 4,145,372 A | 3/1979 | Murray et al. |
| 4,217,435 A | 8/1980 | McConnell et al. |
| 4,305,847 A | 12/1981 | Stoetzer et al. |
| 4,308,298 A | 12/1981 | Chen |
| 4,370,212 A | 1/1983 | Mahr et al. |
| 4,374,898 A | 2/1983 | Mahr |
| 4,398,642 A | 8/1983 | Okundaira et al. |
| 4,482,588 A | 11/1984 | Fagerburg et al. |
| 4,501,781 A | 2/1985 | Kushida et al. |
| 4,555,450 A | 11/1985 | Uram, Jr. |
| 4,657,988 A | 4/1987 | Sugerman et al. |
| 4,759,971 A | 7/1988 | Weissberger et al. |
| 4,886,698 A | 12/1989 | Purdy |
| 5,811,163 A | 9/1998 | Ohno et al. |
| 6,093,462 A | 7/2000 | O'Herron et al. |
| 6,244,454 B1 | 6/2001 | Yoshioka et al. |
| 6,270,867 B1 | 8/2001 | Eckstein et al. |

(Continued)

FOREIGN PATENT DOCUMENTS

JP    403246031 A    11/1991

(Continued)

OTHER PUBLICATIONS

"Better Bonding and Metallocene-Like Catalysis Benefits for Elastomers," Kenrich Petrochemicals, Inc. Bayonne, NJ, USA.

(Continued)

*Primary Examiner* — Michael C Miggins
(74) *Attorney, Agent, or Firm* — Rissman Hendricks & Oliverio LLP (57) ABSTRACT

A plastic container or preform includes a multilayer wall having at least one layer of polyester resin, at least one layer of barrier resin, and an adhesion-promoting material blended with the barrier resin and/or the polyester resin to promote bonding between the barrier and polyester layers. The adhesion-promoting material includes an organometallic coupling agent based upon titanium, zirconium or aluminum. The organometallic coupling agent preferably has an amino end group with an affinity for carboxylic end groups in the polyester, and preferably is selected from the group consisting of neopentyl(diallyl)oxy, tri(N-ethylenediamino) ethyl titanate, zirconate and aluminate. Coupling agents based upon titanium and zirconium are particularly preferred for containers and preforms having a clear (non-colored) wall.

39 Claims, 4 Drawing Sheets

U.S. PATENT DOCUMENTS

| | | | |
|---|---|---|---|
| 6,294,609 | B1 | 9/2001 | Bertin et al. |
| 6,391,407 | B1 | 5/2002 | Kashiba et al. |
| 6,431,401 | B1 | 8/2002 | Giblin et al. |
| 6,464,106 | B1 | 10/2002 | Giblin et al. |
| 2004/0065984 | A1* | 4/2004 | Ota et al. ............... 264/530 |

FOREIGN PATENT DOCUMENTS

| | | | |
|---|---|---|---|
| JP | 04178459 A | * | 6/1992 |
| JP | 404352644 A | | 12/1992 |
| JP | 10-310659 | | 11/1998 |
| JP | 11-310712 | | 11/1999 |

OTHER PUBLICATIONS

*Ken-React Reference Manual: Titanate, Ziconate and Aluminate Coupling Agents*, Kenrich Petrochemicals, Inc. Bayonne, NJ, USA, Bulletin KR 401.

Salvatore J. Monte: "Injection Molding with Neoalkoxy Titanates and Zirconates," Plastics World/Jan. 1995; Kenrich Petrochemicals, Inc., USA.

Salvatore J. Monte: "Compounding and Molding with Neoalkoxy Titanates and Zirconates," Bulletin CM '97; Kenrich Petrochemicals, Inc., USA (1997).

Salvatore J. Monte; "Neoalkoxy Titanate & Zirconate Coupling Agent Additives in Thermoplastics," Polymers and Polymer Composites, vol. 10, No. 1, 2002; Kenrich Petrochemicals, Inc., USA.

Salvatore J. Monte: "Manufacturing Better Polymer Compounds with Titanate and Zirconate Coupling Agents," Rubber Technology International '98; Kenrich Petrochemicals, Inc., USA.

Brad Dawson: Rubber and Plastics News; Sep. 21, 1998 Issue, Kenrich Petrochemicals, Inc., USA.

Salvatore J. Monte: "Compounding and Molding with Neoalkoxy Titanates and Zirconates," Bulletin CM '97; Kenrich Petrochemicals, Inc., USA.

Salvatore J. Monte; "Titanates, Zirconates and Aluminates in High Solids and Water-Based Coatings," PPCJ Oct. 1997; Kenrich Petrochemicals, Inc., USA.

Salvatore J. Monte: "Additives Give Better Bonding," Reinforced Plastics, Jun. 1996; Kenrich Petrochemicals, Inc., USA.

Salvatore J. Monte: "Better Bonding and Metallocene-Like Catalysis Benefits for Elastomer," Rubber Technology International '96; Kenrich Petrochemicals, Inc., USA.

Jan Schult: "Organometallic Esters Enhance Recycled PET/PC Blends," Reprint from Plastics Formulating & Compounding Sep./Oct. 1996.

"Ken-React Reference Manual Titanate, Zirconate and Aluminate Coupling Agents," Kenrich Petrochemicals Inc., USA; Bulleting KR0401 (1993).

"Better Bending and Metallocine-Like Catalysis Benefits," Kenrich Petrochemicals (No Date).

GB Search Report dated Aug. 10, 2009 in corresponding related to GB 0701187.7.

* cited by examiner

DELAMINATION-RESISTANT MULTILAYER CONTAINER, PREFORM AND METHOD OF MANUFACTURE

The present invention is directed to multilayer plastic containers and preforms, and to methods of manufacturing such containers and preforms.

BACKGROUND AND SUMMARY OF THE INVENTION

Multilayer plastic containers and preforms typically include one or more layers of plastic resin such as polyethylene terephthalate (PET) alternating with one or more layers of barrier resin such as nylon or ethylene vinyl alcohol (EVOH) to resist transmission of gas, water vapor and/or flavorants, including odorants and essential oils, through the container wall. An important property of containers of this type is interlaminar adhesion to resist delamination between or among the various layers during filling and handling of the containers by the container manufacturer and the product packager, and during use of the container by the consumer. Various techniques have been proposed for increasing interlaminar adhesion, which generally result in a decrease in barrier properties, an increase in manufacturing cost and/or an increase in other undesirable container properties such as haze in the container wall. It is therefore a general object of the present invention to provide a multilayer container, a container preform and a method of manufacture having improved adhesion characteristics between the layers of the container (and preform) wall without significantly affecting container cost or other parameters of manufacture.

A plastic container in accordance with one presently preferred aspect of the invention includes a multilayer wall having at least one layer of polyester resin, at least one layer of barrier resin, and an adhesion-promoting material blended with the barrier resin and/or the polyester resin to promote bonding between the barrier and polyester layers. In the preferred embodiments of the invention, the adhesion-promoting material is blended with the barrier resin. The adhesion-promoting material includes an organometallic coupling agent based upon titanium, zirconium or aluminum. The organometallic coupling agent preferably has an amino end group with an affinity for the carboxylic end group of the polyester, and preferably is selected from the group consisting of neopentyl(diallyl)oxy, tri(N-ethylenediamino) ethyl titanate, zirconate and aluminate. Coupling agents based upon titanium and zirconium are particularly preferred for containers having a clear (non-colored) wall.

The polyester resin preferably is selected from the group consisting of PET, polyethylene naphthalate (PEN), blends and copolymers of PET and PEN, and process regrind that consists essentially of PET, PEN, or blends or copolymers of PET and PEN. The barrier resin preferably is selected from the group consisting of EVOH, nylon, acrylonitrile copolymers, blends of EVOH and nylon, nanocomposites of EVOH or nylon and clay, blends of EVOH and an ionomer, acrylonitrile, cyclic olefin copolymers, polyglycolic acid (PGA), and blends thereof. EVOH and meta-xylenediamine (MXD) nylon are particularly preferred. Active oxygen absorbing barrier resins also may be employed in combination with or in place of the listed passive barrier resins.

Other aspects of the invention include a plastic container preform, methods of making a plastic container and a preform, a barrier resin blend, a method of processing a barrier resin and a multilayer article in accordance with the invention.

BRIEF DESCRIPTION OF THE DRAWINGS

The invention, together with additional objects, features, advantages and aspects thereof, will be best understood from the following description, the appended claims and the accompanying drawings, in which:

DETAILED DESCRIPTION OF PREFERRED EMBODIMENTS

The Ken-React Reference Manual, published by Kenrich Petrochemicals, $2^{nd}$ edition 1993, Bulletin KR 0401, is incorporated herein by reference.

Figure 5A:
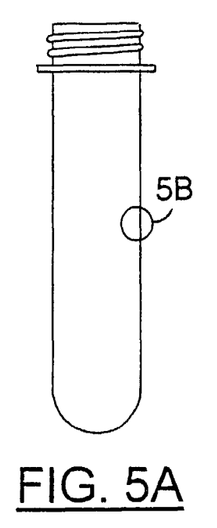
FIGS. 5A and 5B are schematic diagrams of a container preform in accordance with one aspect of the invention.
Figure 5B:
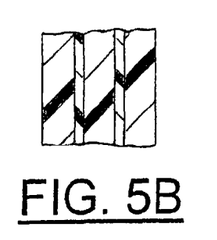
Figure 6A:
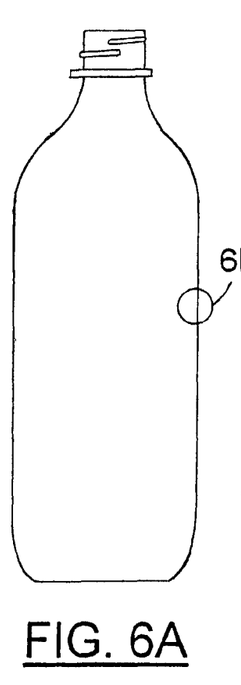
FIGS. 6A and 6B are schematic diagrams of a plastic container in accordance with another aspect of the invention.
Figure 6B:
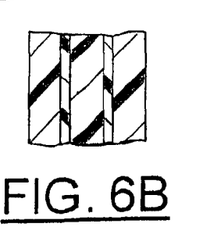

Containers and preforms in accordance with the present invention have a multilayer wall with at least one layer of polyester resin alternating with at least one layer of barrier resin. (Additional layers not germane to the present invention may also be included, such as post consumer resin layers.) For example, a three-layer container or preform may have a wall with layers in the sequence polyester/barrier/polyester. A five-layer container or preform may have wall layers in the sequence polyester/barrier/polyester/barrier/polyester. The barrier layer or layers may extend throughout the bottom wall and the sidewall of the container or preform, or may be confined to a portion of the sidewall, for example. The barrier layers may or may not extend into the finish of the container or preform. FIGS. 6A and 6B are schematic illustrations of a five-layer container in accordance with the invention, the size and geometry being for illustrative purposes only. All exemplary test containers (and preforms) are five-layer containers (and preforms) of the type illustrated in FIGS. 6A and 6B (and FIGS. 5A and 5B). In accordance with one aspect of the present invention, an organometallic coupling agent based upon titanium, zirconium or aluminum is blended in each barrier layer and/or each polyester layer to promote adhesion between the barrier and polyester layers.

The polyester resin preferably is selected from the group consisting of PET, PEN, blends and copolymers of PET and PEN, and process regrind that consists essentially of PET, PEN, or blends or copolymers of PET and PEN. In the examples discussed in the present application, the polyester resin was PET.

The barrier resin is a thermoplastic material that has a low gas and/or water vapor transmission rate, and/or exhibits a high barrier to transmission of flavorants including odorants and essential oils. The following materials are preferred: EVOH, nylon (including amorphous nylon and semicrystalline nylon such as MXD6), acrylonitrile copolymers, blends of EVOH and nylon, blends of EVOH and an ionomer, cyclic olefin copolymers, PGA, nanocomposites of EVOH or nylon and clay, and blends thereof. EVOH and nylon are particularly preferred. MXD6 nylon and EVOH were employed as barrier resins in the examples discussed in this application.

properties, and thus the present invention facilitates improved barrier properties of the resin without increasing the thickness of the barrier resin layer. The following Table 1 shows plaque screening test results on MXD6 barrier material without coupling agent (control), or blended with either LICA-44 or NZ-44 coupling agent, or blended with LICA-12 (neopentyl (diallyl)oxy, tri(dioctyl)phosphato titanate) or NZ-12 (neopentyl(diallyl)oxy, tri(dioctyl)phosphato zirconate) coupling agents also supplied by Kenrich:

TABLE 1

| Additive | Additive % | Processing Temp (° C.) | Test | Resin RV | Resin IV (dl/g) | Plaque RV | Plaque IV (dl/g) |
|---|---|---|---|---|---|---|---|
| Control | — | 260 | IV & Visual | 1.8795 | 1.41 | 1.837 | 1.35 |
| LICA-12 | 0.35 | 230 | IV & Visual | 1.8795 | 1.41 | 1.836 | 1.35 |
| LICA-44 | 0.35 | 230 | IV & Visual | 1.8795 | 1.41 | 1.832 | 1.35 |
| NZ-12 | 0.35 | 230 | IV & Visual | 1.8795 | 1.41 | 1.834 | 1.35 |
| NZ-44 | 0.35 | 230 | IV & Visual | 1.8795 | 1.41 | 1.825 | 1.34 |

The organometallic coupling agents employed in the present invention preferably, although not necessarily, are marketed by Kenrich Petrochemicals Inc. of Bayonne, N.J. Coupling agents that are amino functionalized—i.e., that include an amino end group—are preferred. Such amino end groups in the coupling agent have an affinity for polyester, carbonyl and acid end groups in the structural resin layers. Neopentyl(diallyl)oxy, tri(N-ethylenediamino) ethyl titanate marketed under the trade designation LICA-44 and neopentyl (diallyl)oxy, tri(N-ethylenediamino) ethyl zirconate marketed under the trade designation NZ-44 are particularly preferred. Corresponding organometallic coupling agents based upon aluminum can tint the wall of a clear (non-colored) plastic container, but may be employed where the container is intentionally colored and such tinting would not be an issue. Other coupling agents marketed by Kenrich and having amino end groups include isopropyl tri(N-ethylenediamino) ethyl titanate (KR-44), neopentyl(diallyl)oxy, tri(m-amino) phenyl titanate (LICA-97), dineopentyl(diallyl)oxy, diparamino beneoyl zirconate (NZ-37) and neopentyl(diallyl)oxy, tri(m-amino)phenyl zirconate (NZ-97). NZ-44 and LICA-44 coupling agents were employed in the examples discussed in this application.

It is currently preferred that the coupling agent be blended with the barrier resin. Because the barrier resin layers form a relatively small percentage by weight of the overall preform or container, a lesser quantity of coupling agent is required than if the coupling agent were blended with the polyester resin. However, the coupling agent could be blended with the polyester resin, or with both the polyester resin and the barrier resin, in accordance with the broadest aspects of the invention.

The organometallic coupling agent typically is in the form of a liquid, and preferably is blended with the barrier resin material prior to forming the multilayer container. In the tests described in this application, the liquid coupling agent additive was blended with particles of the barrier material (MXD6 or EVOH) at room temperature before feeding the blend to the extruder. This blending could also be done by master batch concentration by the barrier material supplier. The coupling agent acts as a melt phase modifier during the manufacturing process, which can lower the processing temperature and/or permit use of higher intrinsic viscosity (IV) barrier resins. Higher IV barrier resins tend to have better barrier The plaques were made by injection molding at the processing temperatures indicated in the Table. The plaques were stepped plaques 6.25 in (158.75 mm) long by 1.75 in (44.45 mm) wide. The plaques had five equal sections of stepped thicknesses of 0.16 in (4.06 mm), 0.13 in (3.3 mm), 0.10 in (2.54 mm), 0.07 in (1.78 mm) and 0.04 in (1 mm). The visual tests consisted of observation whether the plaque mold had completely filled. The control sample required a processing temperature of 260° C. to fill the plaque mold completely, while the samples with coupling agents required a processing temperature of only 230° C. to fill the plaque mold completely. It will also be noted that LICA-12 and NZ-12 coupling agents, which have phosphate end groups rather than amino end groups, also achieved the reduced processing temperature, although these additives would not be preferred for promoting adhesion to polyester layers because of the absence of the amino end groups.

Table 1 also indicates the relative viscosities (RV) and intrinsic viscosities (IV) of the base resin and the plaques. These viscosities were measured in a Viscotek model Y501C viscometer employing standard dilute solution viscometry techniques. Relative viscosities were measured at the "low" range of the equipment. Intrinsic viscosities were measured as described in the equipment manual with use of the Solomon-Gatesman equation. Resin viscosities were measured at 30° C. in 60:40 Phenol:1,1,2,2 Tetrachloroethane. Thus, as shown in Table 1, the coupling agents permitted the processing temperature to be lowered 30° C. and still make good plaques. The control (MXD6 without coupling agent) could not be processed at temperatures below 260° C. in the equipment employed. (The same Arburg Model 320-210-500 molding equipment was employed for all tests.) There were no significant differences among the intrinsic viscosities of the blends and the control, demonstrating that there was no degradation of the polymer molecular weight.

The following Table 2 demonstrates the increase in barrier properties employing an MXD6 barrier resin of higher intrinsic viscosity (IV), which was enabled by blending the barrier resin with the coupling agent. In test containers of Table 2, the containers with MXD6 barrier resin were of the five-layer construction of FIGS. 6A and 6B, with the total weight percentages of barrier resin (blended with coupling agent) being 3%, such that each barrier layer was approximately 1.5 wt % of the total container weight. That is, the NZ-44 coupling agent was 0.5 wt % of the total barrier resin, and the blend of coupling agent and barrier resin was 3 wt % of the containers.

TABLE 2

| Container Construction | MXD6 IV* (dl/g) | NZ-44 % | Container Transmission** (cc-CO2/day) |
|---|---|---|---|
| Monolayer PET | N/A | N/A | 1.60 |
| 3% MXD6 | 1.41 | 0.5 | 1.00 |
| 3% MXD6 | 1.60 | 0.5 | 0.78 |

*Measured @ 30° C. in 60:40 Phenol : 1,1,2,2 Tetrachloroethane employing the Viscotek equipment and techniques discussed above.
**28 mm 500 ml beverage containers were filled at 3.0 gas volumes of $CO_2$ by chemical carbonation techniques and were capped with 28 mm closures. These closures were polypropylene closures with ethylene vinyl acetate (EVA) liners as disclosed in U.S. Pat. No. 5,306,542. After being allowed to equilibrate for 14 days at 68 F./50% RH storage, the total container $CO_2$ transmission rate was measured by placing the container within a sealed vessel with a known capture volume. The sealed vessel had two ports through which nitrogen carrier gas flowed in through one of the ports and exited the vessel from the other port. The exit port was directed to a Mocon C-IV $CO_2$ test machine used for detecting the amount of $CO_2$. The quantity of $CO_2$ was measured for a period of time, from which the $CO_2$ transmission rate was determined.

The process of container manufacture preferably involves manufacture of a preform, followed by blow molding the preform to form the container. In the examples discussed in this application, the preform was formed in a sequential injection molding operation of a type illustrated in U.S. Pat. Nos. 4,550,043, 4,609,516, 4,710,118 and 4,954,376. FIGS. 5A and 5B are a schematic illustrations of a preform in accordance with the invention, the size and geometry being for illustrative purposes only. However, the preform can also be formed in a simultaneous injection molding operation of a type illustrated in U.S. Pat. Nos. 4,990,301 and 5,098,274, an over-molding operation of a type illustrated in U.S. Pat. No. 6,428,737, a compression molding operation of a type illustrated in U.S. published application 2002/0098310 using a mold charge that includes the polyester resin and the barrier resin/coupling agent blend, or in a coextrusion operation that produces a hollow tube having alternate layers of polyester resin and barrier resin blend. These specific citations are merely exemplary.

The amount of coupling agent blended with the barrier resin preferably does not exceed about 4% by weight of the blend. The amount of coupling agent more preferably does not exceed about 1.5% by weight of the blend. All percentages in this application are by weight unless otherwise indicated.

The presently preferred coupling agents identified above are well suited for the chemistries of the disclosed barrier and polyester resins. The chemical functionalities of the coupling agents do not affect the processability or barrier properties of the barrier material, other than acting as a melt phase modifier as discussed above. The preferred organometallic coupling agents promote bonding between the polyester and barrier resin layers while the materials are in contact at elevated melt temperatures; it was difficult to separate the layers of a preform after the preform had cooled. While not being bound by any particular theory or mechanism, one theory is that the bonding between the polyester resin layers and the barrier resin layers promoted by the organometallic coupling agents includes covalent bonding, ionic bonding and/or polar bonding depending upon the type of barrier resin employed.

Figure 2A:
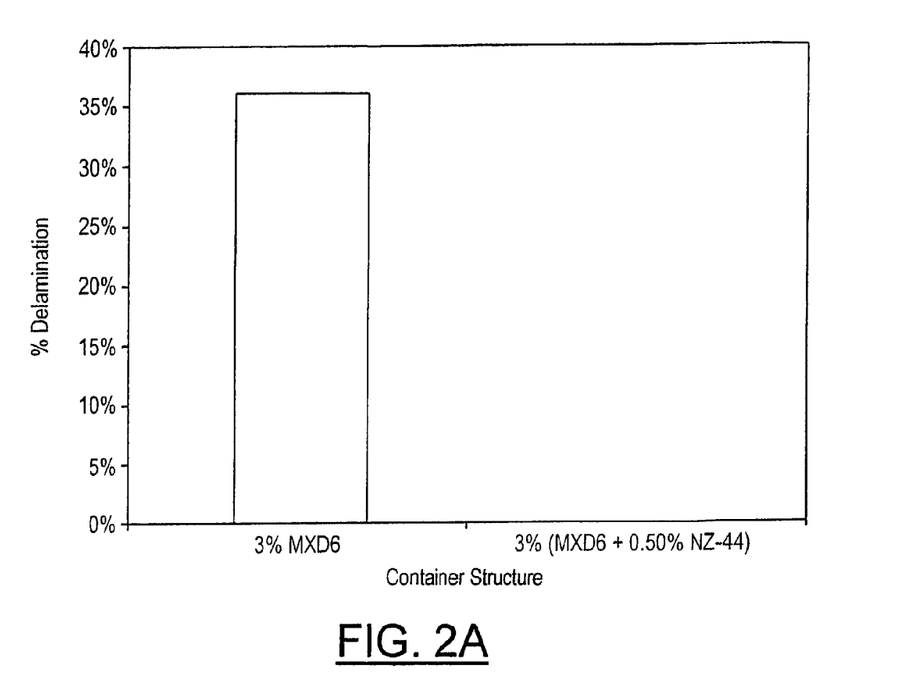
Figure 2B:
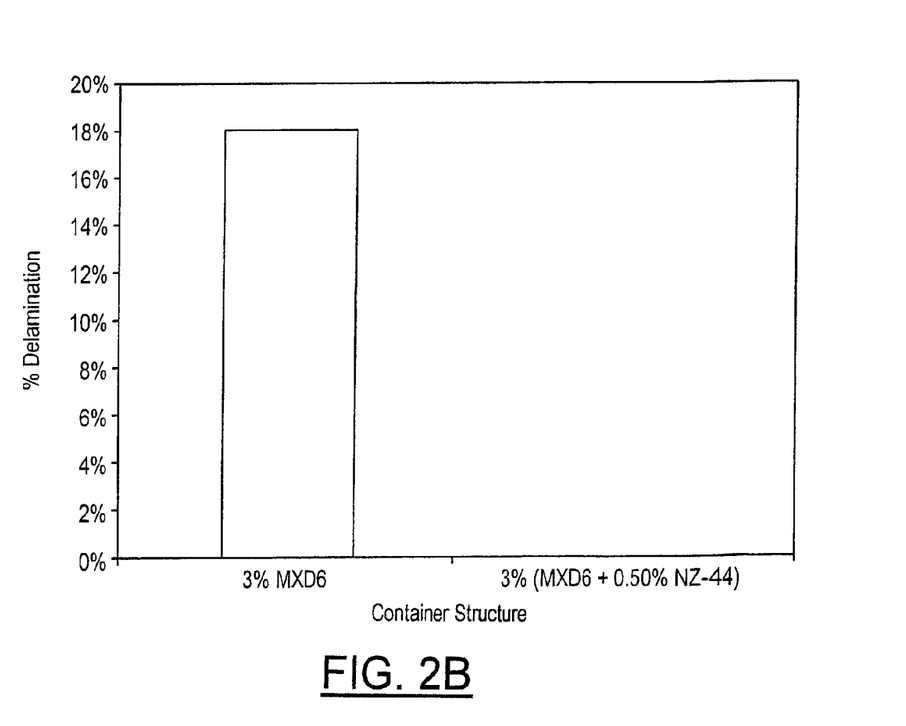
Figure 3A:
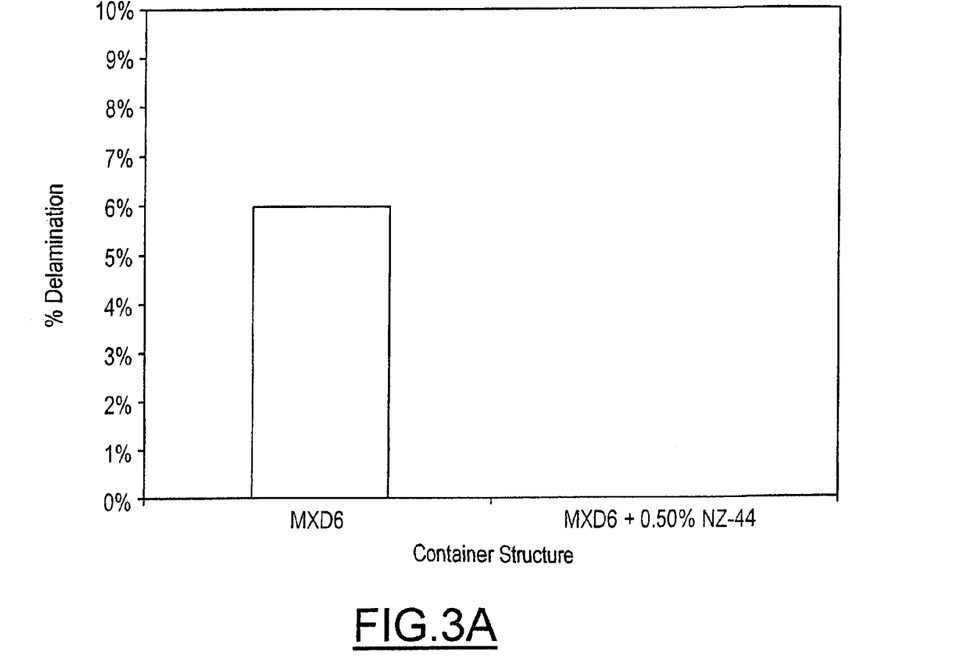
Figure 3B:
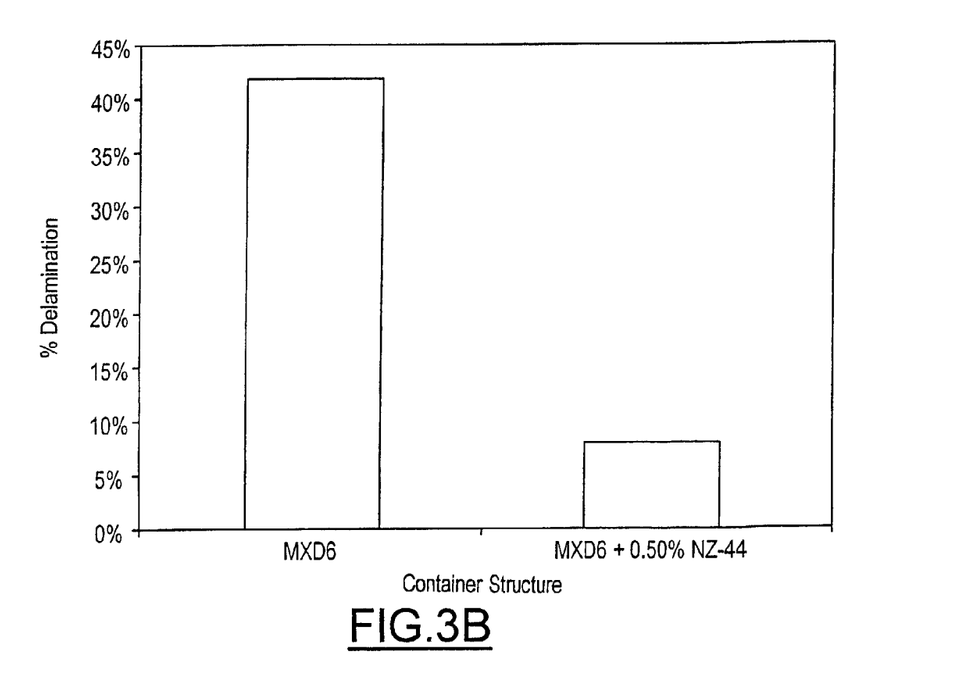
Figure 4:
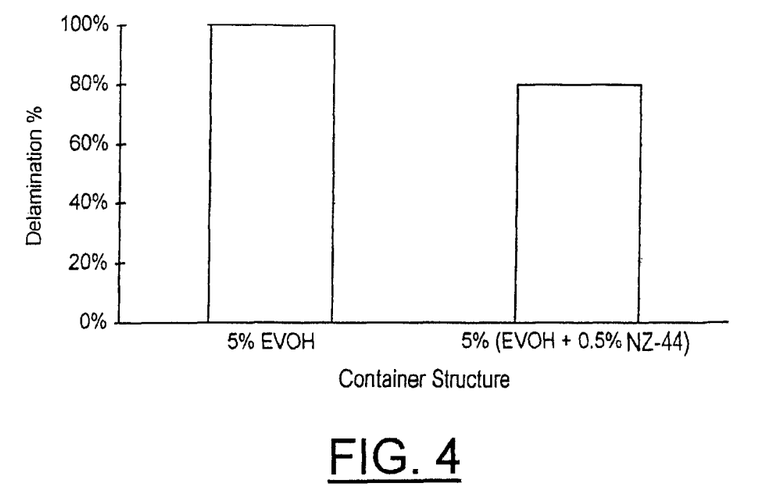

FIGS. 1-4 illustrate delamination test results on various container samples constructed in accordance with the present invention. Each container had a five-layer wall of PET/MXD6/PET/MXD6/PET configuration (FIGS. 1-3B) or PET/EVOH/PET/EVOH/PET configuration (FIG. 4). In all tests, the containers were experimental containers constructed for comparison purposes only. The tests were arbitrarily devised to obtain differentiation in data, and do not reflect any performance specification or conditions of use. In each figure, the ordinate indicates the percentage of containers in which delamination was observed by visual inspection as a result of the test, while the abscissa indicates the container structure, specifically the total amount of barrier material by weight and the amount of NZ-44 or LICA 44 coupling agent employed. With the exception of the amount and type of coupling agent (NZ-44 or LICA-44), and the type of barrier resin employed (EVOH or MXD6), all containers in each test were identical.

Figure 1:
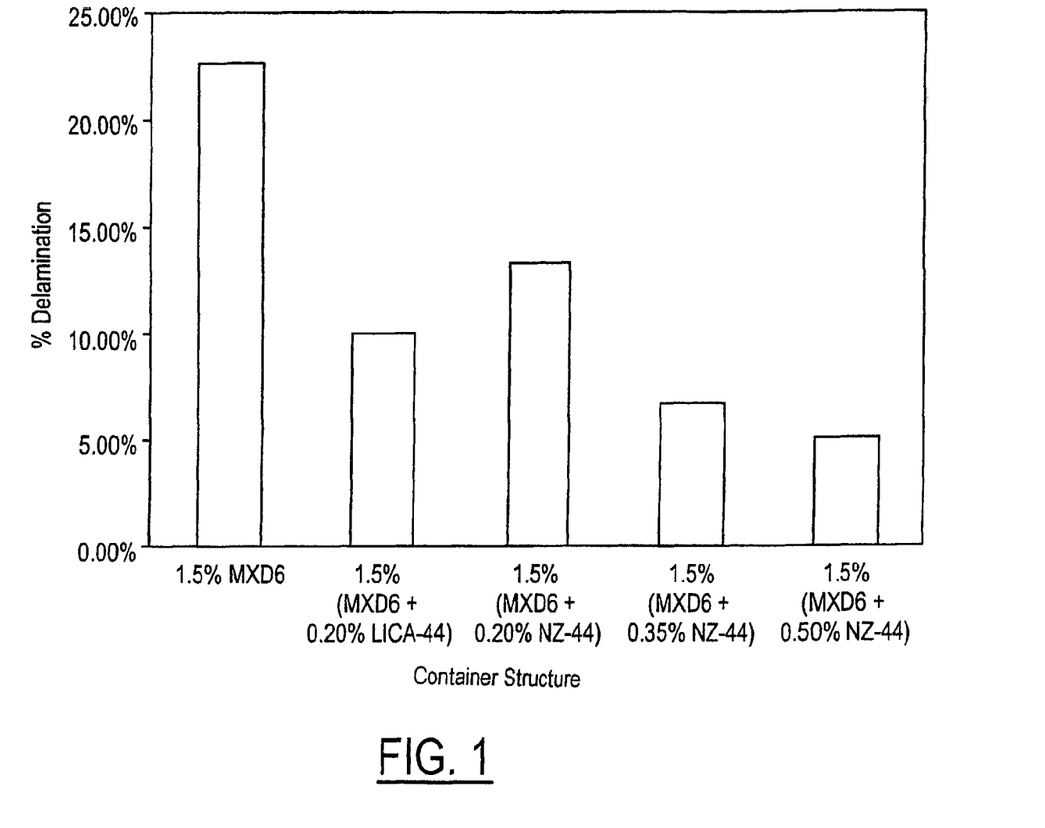
FIGS. 1 to 4 are graphic illustrations of test results on containers fabricated in accordance with exemplary embodiments of the invention.

FIG. 1 illustrates the results of drop tests performed on twenty-four ounce non-round containers having a rounded rectangular cross section. The containers were filled with water, in which a blue dye was added to facilitate visual identification of delaminations where they occurred. The barrier layers totaled 1.5% of the containers by weight, with the percentages of NZ-44 or LICA-44 indicated in FIG. 1 (and in FIGS. 2A-4) being percentages of the total barrier layers—e.g., 0.20% of the 1.5% barrier layer or 0.003% coupling agent based upon the total weight of the container. The filled containers were dropped onto a cement base from a height of three feet so that the containers impacted on their bottoms, and then were examined for delamination. As shown in FIG. 1, approximately 22% of the containers showed delamination without the NZ-44 or LICA-44 coupling agent in the barrier layers. The containers having MXD6 blended with 0.2% LICA-44 showed delamination in 10% of the containers. The percentage of containers showing delamination progressively decreased in container have 0.20%, 0.35% and 0.50% NZ-44. The last column in FIG. 1 shows delamination in 5% of containers when NZ-44 in the amount of 0.50% by weight was mixed with the MXD6 barrier material. This percentage of NZ-44 zirconate coupling agent was then employed in subsequent tests (FIGS. 2A-4).

FIGS. 2A and 2B illustrate side-impact test results on 400 ml cylindrical carbonated beverage containers. This side-impact testing involved a single impact against the container sidewall with a steel wedge and with the container clamped in stationary position. The energy of the impact was approximately 3.3 joules. FIG. 2A illustrates test results with the containers filled with water, and FIG. 2B illustrates test results with the containers filled with water and carbonated at 3.0 GV (gas volumes). The barrier resin layers totaled 3% by weight of the containers. In the samples having a coupling agent, the coupling agent was in the amount of 0.50% of the total barrier resin layers. Both FIGS. 2A and 2B show significant percentages of containers without the coupling agents of the present invention exhibiting delamination after testing, while containers in which the coupling agent was blended with the barrier resin exhibited no delamination after testing.

FIGS. 3A and 3B illustrate the results of drop tests on highly embossed 500 ml cylindrical beverage containers. These embossments were decorative design details molded into the container walls, and tend to act as stress concentrators and promote delamination in the container walls. In both of the tests of FIG. 3A and 3B, the containers were filled with water and dropped onto a cement base to impact on their bottoms. FIG. 3A illustrates the results of a three-foot drop. The containers containing MXD6 barrier material exhibited delamination in 6% of the containers, while the containers having MXD6 with 0.50% NZ-44 in the barrier layers exhibited no delamination. The drop height was then increased to six feet, with the results being illustrated in FIG. 3B. The containers without coupling agents exhibited delamination in 42% of the containers, while the containers with coupling agent exhibited delamination in only about 8% of the containers. The coupling agent/barrier resin blend constituted 3% of the total container weight in the tests of FIGS. 3A and 3B.

FIG. 4 illustrates the results of a three-foot drop test on eight ounce cylindrical containers having 5% EVOH (or EVOH blended with coupling agent) as the barrier layer. In the three-foot drop test, in which the water-filled container was dropped onto its base as described above in connection with FIG. 1, FIG. 4 shows that there was a 20% reduction in delamination when the coupling agent was blended with the barrier material. In a side-impact test, in which the water-filled container was impacted on its sidewall as described above in connection with FIG. 2A, the containers showed no delamination both with and without the coupling agent.

There have thus been disclosed a multilayer container, a multilayer preform, a barrier resin blend for use in a multilayer container, a method of making a multilayer preform or container, and a multilayer plastic article of manufacture that fully satisfy all of the objects and aims previously set forth. The container, barrier blend and method of manufacture have been disclosed in conjunction with a number of exemplary embodiments thereof, and several modifications and variations have been discussed. Other modifications and variations will readily suggest themselves to persons of ordinary skill in the art. For example, the invention in its broadest aspects can also be applied to other articles of manufacture having multilayer walls, particularly walls with one or more barrier layers, such as container closures and liners, or films or sheets for later thermoforming, without departing from the scope of the invention in its broadest aspects. The invention is intended to embrace all such modifications and variations as fall within the spirit and broad scope of the appended claims.

The invention claimed is:

1. A plastic container having a multilayer wall that includes:
   at least one layer of polyester resin,
   at least one layer of barrier resin, and
   an adhesion-promoting material blended with said barrier resin and/or said polyester resin to promote bonding between said barrier and polyester layers, said adhesion-promoting material including an organometallic coupling agent based upon titanium, zirconium or aluminum.

2. The container set forth in claim 1 wherein said polyester resin is selected from the group consisting of: PET, PEN, blends or copolymers of PET and PEN, and process regrind consisting essentially of PET, PEN, or blends or copolymers of PET and PEN.

3. The container set forth in claim 1 wherein said barrier resin is selected from the group consisting of: EVOH, nylon, acrylonitrile copolymers, blends of EVOH and nylon, nanocomposites of EVOH or nylon and clay, blends of EVOH and an ionomer, acrylonitrile, cyclic olefin copolymers, polyglycolic acid, and blends thereof.

4. The container of claim 1 wherein the coupling agent is selected from the group consisting of neopentyl(diallyl)oxy, tri(N-ethylenediamine) titanate, neopentyl(diallyl)oxy, tri(N-ethylenediamine) zirconate and neopentyl(diallyl)oxy, tri(N-ethylenediamine) aluminate.

5. The container set forth in claim 1 wherein said organometallic coupling agent includes an amino end group.

6. The container set forth in claim 5 wherein said organometallic coupling agent is selected from the group consisting of: alkyl or allyl titanate, alkyl or allyl zirconate and alkyl or allyl aluminate.

7. The container set forth in claim 6 wherein said coupling agent consists essentially of alkyl or allyl titanate or alkyl or allyl zirconate.

8. A plastic container having a multilayer wall that includes:
   at least one layer of polyester resin selected from the group consisting of PET, PEN, blends or copolymers of PET and PEN, and process regrind that consists essentially of PET, PEN, or blends or copolymers of PET and PEN,
   at least one layer of barrier resin selected from the group consisting of EVOH, nylon, acrylonitrile copolymers, blends of EVOH and nylon, nanocomposites of EVOH or nylon and clay, blends of EVOH and an ionomer, acrylonitrile, cyclic olefin copolymers, polyglycolic acid, and blends thereof, and
   an organometallic coupling agent blended in said at least one layer of barrier resin to promote bonding between said barrier and polyester layers, said organometallic coupling agent having an amino end group that has an affinity for carboxylic and groups in the polyester resin and being selected from the group consisting of organo titanate, organo zirconate and organo aluminate.

9. The container of claim 8 wherein the coupling agent is selected from the group consisting of neopentyl(diallyl)oxy, tri(N-ethylenediamine) titanate, neopentyl(diallyl)oxy, tri(N-ethylenediamine) zirconate and neopentyl(diallyl)oxy, tri(N-ethylenediamine) aluminate.

10. The container set forth in claim 8 wherein said coupling agent is selected from the group consisting of alkyl or allyl titanate, alkyl or allyl zirconate and alkyl or allyl aluminate.

11. The container set froth in claim 10 wherein said coupling agent consists essentially of alkyl or allyl titanate or alkyl or allyl zirconate.

12. A method of making a multilayer plastic container that includes:
   (a) blending an organometallic coupling agent based on titanium, zirconium or aluminum with a barrier resin, and
   (b) forming a preform in which the blend formed in step (a) is in layers alternating with layers of polyester resin, and in which said coupling agent promotes bonding between said barrier resin and said polyester resin.

13. The process set forth in claim 12 further including: (c) blow molding the preform formed in step (b) into a hollow plastic container.

14. The method of claim 12 wherein the coupling agent is selected from the group consisting of neopentyl(diallyl)oxy, tri(N-ethylenediamine) titanate, neopentyl(diallyl)oxy, tri(N-ethylenediamine) zirconate and neopentyl(diallyl)oxy, tri(N-ethylenediamine) aluminate.

15. The method set forth in claim 12 wherein said step (b) is carried out while said blend formed in said step (a) and said polyester resin are in melt phase.

16. The method set forth in claim 15 wherein said step (b) is carried out by a process selected from the group consisting of simultaneously injection molding said polyester resin and said barrier resin blend, sequentially injection molding said polyester resin and said barrier resin blend, overmolding sequential layers of said polyester resin and said barrier resin blend, compression molding a mold charge that includes said polyester resin and said barrier resin blend, and extruding a hollow tube that includes alternate layers of said polyester resin and said barrier resin blend.

17. The method set forth in claim 12 wherein said coupling agent has an amino end group.

18. The method set forth in claim 17 wherein said organometallic coupling agent is selected from the group consisting of: alkyl or allyl titanate, alkyl or allyl zirconate and alkyl or allyl aluminate.

19. The method set froth in claim 18 wherein said coupling agent consists essentially of alkyl or allyl titanate or alkyl or allyl zirconate.

20. The method set forth in claim 17 wherein said polyester resin is selected from the group consisting of PET, PEN, blends or copolymers of PET and PEN, and process regrind consisting essentially of PET, PEN, or blends or copolymers of PET and PEN.

21. The method set forth in claim 17 wherein said barrier resin is selected from the group consisting of: EVOH, nylon, acrylonitrile copolymers, blends of EVOH and nylon, nanocomposites of EVOH or nylon and clay, blends of EVOH and an ionomer, acrylonitrile, cyclic olefin copolymers, polyglycolic acid, and blends thereof.

22. A preform for blow molding a plastic container having a multilayer wall, which includes:
   at least one layer of polyester resin,
   at least one layer of barrier resin, and
   an adhesion-promoting material blended with said barrier resin and/or said polyester resin to promote bonding between said barrier and polyester layers, said adhesion-promoting material including an organometallic coupling agent based upon titanium, zirconium or aluminum.

23. The preform set forth in claim 22 wherein said polyester resin is selected from the group consisting of: PET, PEN, blends or copolymers of PET and PEN, and process regrind consisting essentially of PET, PEN, or blends or copolymers of PET and PEN.

24. The preform set forth in claim 22 wherein said barrier resin is selected from the group consisting of: EVOH, nylon, acrylonitrile copolymers, blends of EVOH and nylon, nanocomposites of EVOH or nylon and clay, blends of EVOH and an ionomer, acrylonitrile, cyclic olefin copolymers, polyglycolic acid, and blends thereof.

25. The preform of claim 22 wherein the coupling agent is selected from the group consisting of neopentyl(diallyl)oxy, tri(N-ethylenediamine) titanate, neopentyl(diallyl)oxy, tri(N-ethylenediamine) zirconate and neopentyl(diallyl)oxy, tri(N-ethylenediamine) aluminate.

26. The preform set forth in claim 22 wherein said organometallic coupling agent includes an amino end group.

27. The perform set forth in claim 26 wherein said organometallic coupling agent is selected from the group consisting of: alkyl or allyl titanate, alkyl or allyl zirconate and alkyl or allyl aluminate.

28. The preform set forth in claim 27 wherein said coupling agent consists essentially of alkyl or allyl titanate or alkyl or allyl zirconate.

29. A preform for blow molding a plastic container having a multilayer wall, which includes:
   at least one layer of polyester resin selected from the group consisting of PET, PEN, blends or copolymers of PET and PEN, and process regrind that consists essentially of PET, PEN, or blends or copolymers of PET and PEN,
   at least one layer of barrier resin selected from the group consisting of EVOH, nylon, acrylonitrile copolymers, blends of EVOH and nylon, nanocomposites of EVOH or nylon and clay, blends of EVOH and an ionomer, acrylonitrile, cyclic olefin copolymers, polyglycolic acid, and blends thereof, and
   an organometallic coupling agent blended in said at least one layer of barrier resin to promote bonding between said barrier and polyester layers, said organometallic coupling agent having an amino end group that has an affinity for carboxylic end groups in the polyester resin and being selected from the group consisting of organo titanate, organo zirconate and organo aluminate.

30. The preform of claim 29 wherein the coupling agent is selected from the group consisting of neopentyl(diallyl)oxy, tri(N-ethylenediamine) titanate, neopentyl(diallyl)oxy, tri(N-ethylenediamine) zirconate and neopentyl(diallyl)oxy, tri(N-ethylenediamine) aluminate.

31. The preform set forth in claim 29 wherein said coupling agent is selected from the group consisting of ethyl alkyl or allyl titanate, alkyl or allyl zirconate and alkyl or allyl aluminate.

32. The preform set forth in claim 31 wherein said coupling agent consists essentially of alkyl or allyl titanate or alkyl or allyl zirconate.

33. A plastic article of manufacture having a multilayer wall that includes:
   at least one layer of polyester resin,
   at least one layer of barrier resin, and
   an adhesion-promoting material blended with said barrier resin to promote bonding between said barrier and polyester layers, said adhesion-promoting material including an organometallic coupling agent based upon titanium, zirconium or aluminum.

34. The article set forth in claim 33 wherein said polyester resin is selected from the group consisting of: PET, PEN, blends or copolymers of PET and PEN, and process regrind consisting essentially of PET, PEN, or blends or copolymers of PET and PEN.

35. The article set forth in claim 30 wherein said barrier resin is selected from the group consisting of: EVOH, nylon, acrylonitrile copolymers, blends of EVOH and nylon, nanocomposites of EVOH or nylon and clay, blends of EVOH and an ionomer, acrylonitrile, cyclic olefin copolymers, polyglycolic acid, and blends thereof.

36. The article of claim 30 wherein the coupling agent is selected from the group consisting of neopentyl(diallyl)oxy, tri(N-ethylenediamine) titanate, neopentyl(diallyl)oxy, tri(N-ethylenediamine) zirconate and neopentyl(diallyl)oxy, tri(N-ethylenediamine) aluminate.

37. The article set froth in claim 33 wherein said organometallic coupling agent includes an amino end group.

38. The article set forth in claim 37 wherein said organometallic coupling agent is selected from the group consisting of: alkyl or allyl titanate, alkyl or allyl zirconate and alkyl or allyl aluminate.

39. The article set forth in claim 38 wherein said coupling agents consists essentially of alkyl or allyl titanate or alkyl or allyl zirconate.

* * * * *

UNITED STATES PATENT AND TRADEMARK OFFICE
CERTIFICATE OF CORRECTION

| | | |
|---|---|---|
| PATENT NO. | : 8,192,811 B2 | Page 1 of 1 |
| APPLICATION NO. | : 10/388616 | |
| DATED | : June 5, 2012 | |
| INVENTOR(S) | : Philip D. Bourgeois | |

It is certified that error appears in the above-identified patent and that said Letters Patent is hereby corrected as shown below:

At Col. 8, line 15:

"and" should be -- end --

At Col. 8, line 26:

"froth" should be -- forth --

At Col. 9, line 40:

"perform" should be -- preform --

At Col. 10, line 47:

"froth" should be -- forth --

Signed and Sealed this
Fourteenth Day of August, 2012

David J. Kappos
*Director of the United States Patent and Trademark Office*